(12) United States Patent
Yoshioka

(10) Patent No.: US 8,656,763 B2
(45) Date of Patent: Feb. 25, 2014

(54) FAILURE DETECTION APPARATUS AND FAILURE DETECTION METHOD FOR A PARTICULATE FILTER

(75) Inventor: Mamoru Yoshioka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/641,514

(22) PCT Filed: Apr. 30, 2010

(86) PCT No.: PCT/JP2010/057688
§ 371 (c)(1),
(2), (4) Date: Oct. 16, 2012

(87) PCT Pub. No.: WO2011/135718
PCT Pub. Date: Nov. 3, 2011

(65) Prior Publication Data
US 2013/0036805 A1 Feb. 14, 2013

(51) Int. Cl.
*G01M 15/04* (2006.01)
(52) U.S. Cl.
USPC ............................................. 73/114.31
(58) Field of Classification Search
USPC ............................................. 73/114.31
See application file for complete search history.

(56) References Cited

U.S. PATENT DOCUMENTS

| 8,464,522 | B2 * | 6/2013 | Fujiwara et al. | 60/295 |
| 8,561,388 | B2 * | 10/2013 | Yahata et al. | 60/277 |
| 2009/0301062 | A1 | 12/2009 | Sumida et al. | |
| 2012/0297750 | A1 * | 11/2012 | Sun | 60/274 |
| 2013/0030678 | A1 * | 1/2013 | Aoki et al. | 701/113 |

FOREIGN PATENT DOCUMENTS

| JP | A-2007-132290 | 5/2007 |
| JP | A-2008-64621 | 3/2008 |
| JP | A-2008-190502 | 8/2008 |
| JP | A-2009-293518 | 12/2009 |

* cited by examiner

*Primary Examiner* — Freddie Kirkland, III
(74) *Attorney, Agent, or Firm* — Oliff PLC

(57) ABSTRACT

The present invention is intended to provide a technique which is capable of improving detection accuracy at the time of performing failure detection of a particulate filter by the use of a PM sensor. In the present invention, the PM sensor is arranged in an exhaust passage at the downstream side of the particulate filter. Then, the presence or absence of a failure in the particulate filter is determined by making a comparison between an output value of the PM sensor at the time when a predetermined period of time has elapsed after the execution of PM removal processing to remove the particulate matter deposited on the PM sensor is completed, and a predetermined threshold value. At this time, the threshold value is set based on an average value of an amount of intake air in an internal combustion engine during the passage of the predetermined period of time.

4 Claims, 9 Drawing Sheets

(a)

(b)

FAILURE DETECTION APPARATUS AND FAILURE DETECTION METHOD FOR A PARTICULATE FILTER

TECHNICAL FIELD

The present invention relates to a failure detection apparatus and a failure detection method for a particulate filter (hereinafter simply referred to as a filter) which is arranged in an exhaust passage of an internal combustion engine, and which traps particulate matter (Particulate Matter: hereinafter referred to as PM) in an exhaust gas.

BACKGROUND ART

In a filter arranged in an exhaust passage of an internal combustion engine, a failure such as breakage, erosion or the like may occur due to heat deterioration and time degradation. If the failure of the filter occurs, an amount of particulate matter, which is not trapped by the filter but flows into the exhaust passage at the downstream side thereof, will increase. Accordingly, there has been proposed a technique in which a particulate matter (PM) sensor is arranged in the exhaust passage at the downstream side of the filter, so that the failure of the filter is detected based on an output value of the PM sensor.

In Patent Document 1, there is disclosed a PM sensor (fine particulate sensor) which is provided with at least two electrodes. This PM sensor detects an amount of PM deposition in the PM sensor from measured data of an electrical property such as an alternating current impedance between the electrodes.

In Patent Document 2, there is disclosed a technique that detects a failure of a PM trapper based on a ratio between a detected value of an input PM sensor arranged at the upstream side of the PM trapper, and a detected value of an output PM sensor arranged at the downstream side of the PM trapper. In addition, in this Patent Document 2, there is described that when an amount of intake air is less than a predetermined amount, the failure detection of the PM tapper is not carried out.

PRIOR ART DOCUMENTS

Patent Documents

Patent Document 1: Japanese patent application laid-open No. 2008-064621
Patent Document 2: Japanese patent application laid-open No. 2007-132290
Patent Document 3: Japanese patent application laid-open No. 2008-190502
Patent Document 4: Japanese patent application laid-open No. 2009-293518

SUMMARY OF THE INVENTION

Problem to be Solved by the Invention

As a PM sensor used for the failure detection of a filter, there may be adopted a PM sensor which outputs a signal corresponding to an amount of PM deposited on the sensor itself. The present invention has for its object to provide a technique which is capable of improving detection accuracy at the time of performing failure detection of a filter by the use of such a PM sensor.

Means for Solving the Problem

In the present invention, the following measures have been adopted in order to achieve the above-mentioned object. That is, in the present invention, a PM sensor is arranged in an exhaust passage at the downstream side of a filter. Then, the presence or absence of a failure in a particulate filter is determined by making a comparison between an output value of a PM sensor at the time when a predetermined period of time has elapsed after the execution of PM removal processing to remove the particulate matter deposited on the PM sensor is completed, and a predetermined threshold value. At this time, said threshold value is set based on an average value of an amount of intake air in an internal combustion engine during the passage of said predetermined period of time.

More specifically, a failure detection apparatus for a particulate filter according to the present invention, in which a failure of the particulate filter arranged in an exhaust passage of an internal combustion engine is detected, comprises:

a PM sensor that is arranged in the exhaust passage at the downstream side of said particulate filter, and outputs a signal corresponding to an amount of particulate matter deposited on itself;

a PM removal processing execution part that executes PM removal processing to remove the particulate matter deposited on said PM sensor;

a failure determination part that determines the presence or absence of a failure in said particulate filter by making a comparison between an output value of said PM sensor at the time when a predetermined period of time has elapsed after the execution of the PM removal processing by said PM removal processing execution part is completed, and a predetermined threshold value;

an average intake air amount calculation part that calculates an average value of an amount of intake air in the internal combustion engine during a time after the execution of the PM removal processing by said PM removal processing execution part is completed until said predetermined period of time elapses; and a threshold setting part that sets said threshold value based on the average value of the amount of intake air calculated by said average intake air amount calculation part.

As the amount of intake air in the internal combustion engine increases, the flow rate of the exhaust gas passing around the PM sensor in the exhaust passage increases. When the flow rate of the exhaust gas increases, the flow rate of particulate matter also inevitably increases. Assuming that the flow rate of particulate matter becomes large, the amount of particulate matter adhering to the PM sensor itself will increase in comparison with the case where the flow rate of particulate matter is small. However, the amount of particulate matter capable of adhering to the PM sensor per unit time is limited. For that reason, when the flow rate of particulate matter increases, there is a tendency for the ratio of the amount of particulate matter adhering to the PM sensor with respect to the flow rate of particulate matter (hereinafter this ratio being referred to as a PM trapping efficiency) to drop.

In other words, even if the state of the filter is the same, the amount of PM deposition in the PM sensor changes in accordance with the amount of intake air in the internal combustion engine. Accordingly, in the present invention, the threshold value for failure determination is set based on the average value of the amount of intake air during a time after the execution of the PM removal processing is completed, i.e., after particulate matter begins to deposit on the PM sensor again, until the failure determination of the filter is carried out. As a result of this, it is possible to enhance the accuracy in detecting the failure of the filter.

The failure detection apparatus according to the present invention may further comprise an integrated intake air amount calculation part that calculates an integrated value of the amount of intake air in the internal combustion engine from the time when the execution of the PM removal processing by the PM removal processing execution part is completed. In this case, said predetermined period of time may be a period of time until the integrated value of the amount of intake air calculated by the integrated intake air amount calculation part reaches a predetermined determination execution value.

In addition, the failure detection apparatus according to the present invention may further comprise a determination execution value setting part that sets said determination execution value to be smaller when the average value of the amount of intake air calculated by the average intake air amount calculation part is small, in comparison with the time when the average value of the amount of intake air is large.

When the amount of intake air in the internal combustion engine is relatively small, it takes time for the amount of PM deposition in the PM sensor to increase to a certain amount. However, at this time, the PM trapping efficiency in the PM sensor is relatively high. For that reason, even if a period of time after the execution of the PM removal processing is completed until a failure determination of the filter is carried out (i.e., said predetermined period of time) is made shorter, it will be difficult to cause a decrease in failure detection accuracy.

Accordingly, as stated above, the determination execution value is set based on the average value of the amount of intake air. As a result of this, a failure of the filter can be detected as early as possible, while maintaining the detection accuracy.

The present invention can also be grasped as a failure detection method for a particulate filter. For example, a failure detection method for a particulate filter, as one form of the present invention, in which a failure of a particulate filter arranged in an exhaust passage of an internal combustion engine is detected based on an output value of a PM sensor which is arranged in the exhaust passage at the downstream side of the particulate filter, and outputs a signal corresponding to an amount of particulate matter deposited on itself, comprises:

a PM removal processing execution step to execute PM removal processing to remove the particulate matter deposited on said PM sensor;

a failure determination step to determine the presence or absence of a failure in said particulate filter by making a comparison between the output value of said PM sensor at the time when a predetermined period of time has elapsed after the execution of the PM removal processing in said PM removal processing execution step is completed, and a predetermined threshold value;

an average intake air amount calculation step to calculate an average value of an amount of intake air in the internal combustion engine during a time after the execution of the PM removal processing in said PM removal processing execution step is completed until said predetermined period of time elapses; and a setting step to set said threshold value based on the average value of the amount of intake air calculated in said average intake air amount calculation step.

In addition, the failure detection method according to the present invention may further comprise an integrated intake air amount calculation step to calculate an integrated value of the amount of intake air in the internal combustion engine from the time when the execution of the PM removal processing in the PM removal processing execution step is completed. In this case, said predetermined period of time may be a period of time until the integrated value of the amount of intake air calculated in said integrated intake air amount calculation step reaches a predetermined determination execution value.

Moreover, the failure detection method according to the present invention may further comprise a determination execution value setting step to set said determination execution value to be smaller when the average value of the amount of intake air calculated in the average intake air amount calculation step is small, in comparison with the time when the average value of the amount of intake air is large.

Advantageous Effect of the Invention

According to the present invention, it is possible to enhance the accuracy in detecting a failure of a filter.

EMBODIMENTS FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Reference will be made to a first embodiment of the present invention based on FIGS. 1 through 6. Here, description will be made by taking, as an example, a case in which the present invention is applied to the detection of a failure of a filter arranged in an exhaust passage of a diesel engine for driving a vehicle. Also, note that the internal combustion engine related to the present invention is not limited to a diesel engine, but may be a gasoline engine.

[Schematic Construction of Intake and Exhaust Systems of an Internal Combustion Engine]

Figure 1:
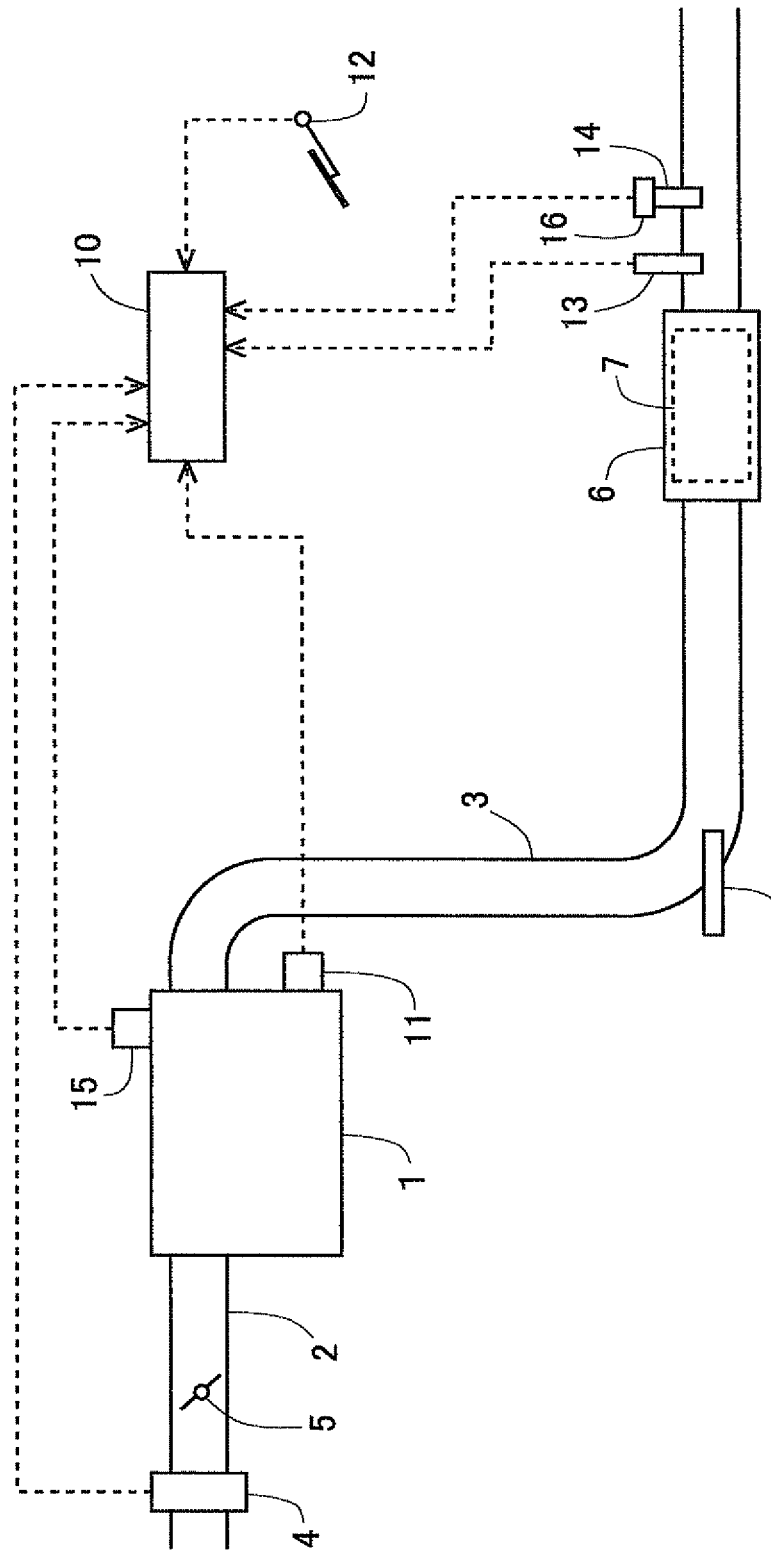
FIG. 1 This is a view showing the schematic construction of intake and exhaust systems of an internal combustion engine according to a first embodiment of the present invention.

FIG. 1 is a view showing the schematic construction of intake and exhaust systems of an internal combustion engine according to this embodiment. The internal combustion engine 1 is a diesel engine for driving a vehicle. An intake passage 2 and an exhaust passage 3 are connected to the internal combustion engine 1. In addition, on the internal combustion engine 1, there is mounted a water temperature sensor 15 for detecting the temperature of cooling water.

In the intake passage 2, there are arranged an air flow meter 4 and a throttle valve 5. The air flow meter 4 serves to detect an amount of intake air sucked into the internal combustion engine 1. The throttle valve 5 serves to adjust the flow rate of intake air flowing through the intake passage 2 by changing the channel cross section of the intake passage 2.

A filter 6 for trapping particulate matter (PM) in an exhaust gas is arranged in the exhaust passage 3. An oxidation catalyst 7 is supported on the filter 6. Here, note that the catalyst supported on the filter 6 may be a catalyst having an oxidation function (e.g., NOx storage reduction catalyst), other than the oxidation catalyst. In addition, the catalyst having an oxidation function may be arranged in the exhaust passage 3 at the upstream side of the filter 6.

A fuel addition valve 8, which serves to add or inject fuel into the exhaust gas, is arranged in the exhaust passage 3 at the upstream side of the filter 6. An exhaust gas temperature sensor 13 and a PM sensor 14 are arranged in the exhaust passage 3 at the downstream side of the filter 6. The exhaust gas temperature sensor 13 is a sensor that detects the temperature of the exhaust gas flowing out of the PM sensor 6. The PM sensor 14 is a sensor that outputs an electrical signal corresponding to an amount of particulate matter deposited on itself. The PM sensor 14 is provided with an electric heater 16 which serves to heat the PM sensor 14. Here, note that the details of the PM sensor 14 will be described later.

In the internal combustion engine 1, there is arranged in combination therewith an electronic control unit (ECU) 10 for controlling the internal combustion engine 1. The air flow meter 4, the water temperature sensor 15, the exhaust gas temperature sensor 13, and the PM sensor 14 are electrically connected to the ECU 10. Moreover, a crank position sensor 11 and the water temperature sensor 15 of the internal combustion engine 1, and an accelerator opening sensor 12 of the vehicle on which the internal combustion engine 1 is mounted are electrically connected to the ECU 10. And, their output signals are inputted to the ECU 10. The ECU 10 can derive an engine rotational speed of the internal combustion engine 1 based on the output signal of the crank position sensor 11. In addition, the ECU 10 can derive an engine load of the internal combustion engine 1 based on the output signal of the accelerator opening sensor 12.

The throttle valve 5, the fuel addition valve 8, the electric heater 16, and fuel injection valves (illustration omitted) of the internal combustion engine 1 are electrically connected to the ECU 10. Thus, these parts are controlled by the ECU 10.

For example, the ECU 10 carries out filter regeneration processing in which the particulate matter deposited on the filter 6 is oxidized and removed, by controlling the fuel addition valve 8 or the fuel injection valves of the internal combustion engine 1. In the filter regeneration processing, it is necessary to raise the temperature of the filter 6 to a target temperature at which the deposited particulate matter can be oxidized. Accordingly, in this embodiment, the filter regeneration processing is achieved by carrying out the addition of fuel from the fuel addition valve 8 or auxiliary fuel injection in the internal combustion engine 1. Fuel is supplied to the oxidation catalyst 7 by carrying out the addition of fuel from the fuel addition valve 8 or the auxiliary fuel injection in the internal combustion engine 1. The temperature of the filter 6 goes up due to the heat of oxidation generated by the oxidation of this fuel in the oxidation catalyst 7.

At the time of the execution of filter regeneration processing, the ECU 10 estimates the temperature of the filter 6 based on the detected value of the exhaust gas temperature sensor 13. Then, the ECU 10 regulates, based on the estimated value, the amount of addition of fuel from the fuel addition valve 8, or the amount of auxiliary fuel injection in the internal combustion engine 1. As a result of this, the temperature of the filter 6 is controlled to the target temperature.

[Schematic Construction of the PM Sensor]

Figure 2:
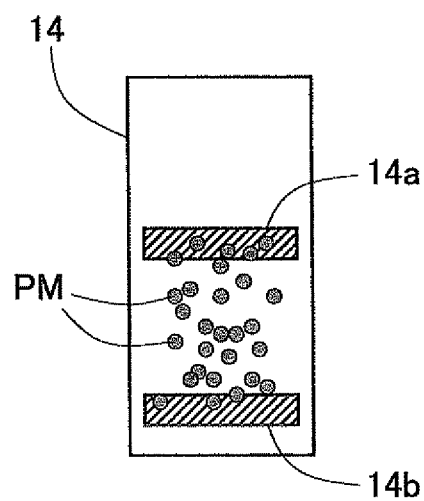
FIG. 2 This is a view showing the schematic construction of a PM sensor according to the first embodiment.
Figure 3:
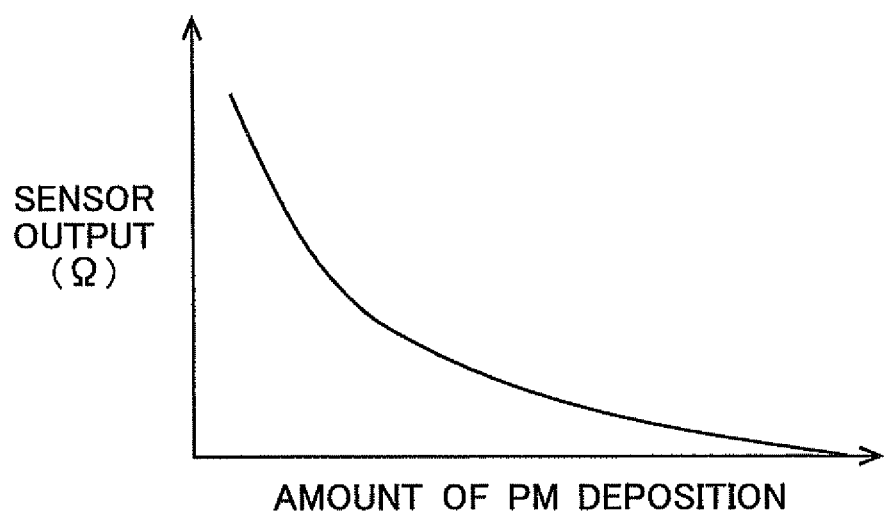
FIG. 3 This is a view showing the relation between an estimated amount of particulate matter in the PM sensor and an output value of the PM sensor according to the first embodiment.
Figure 4:
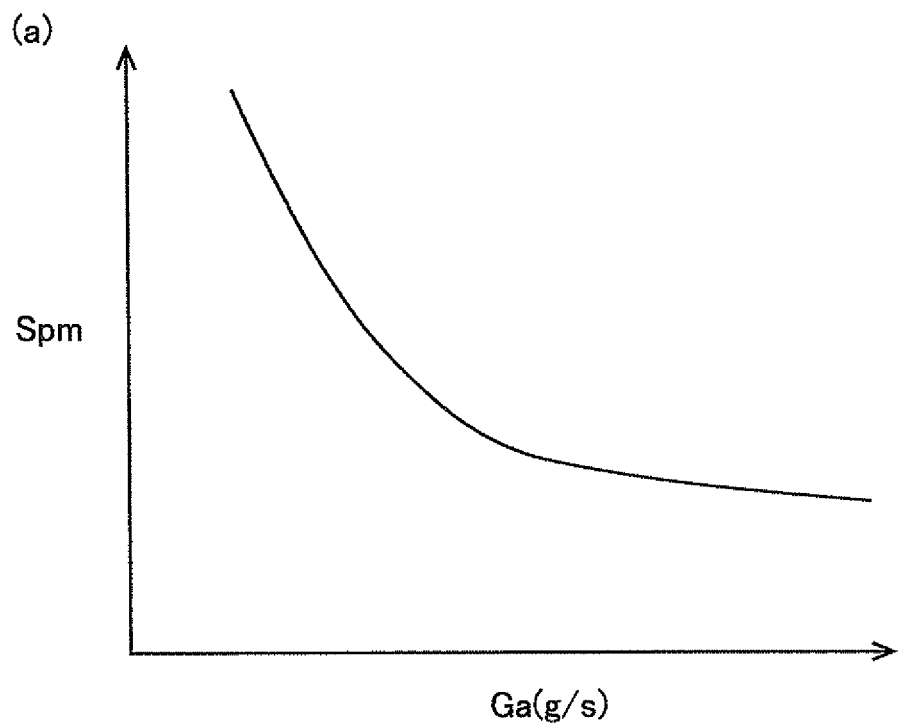
FIG. 4(a) is a view showing the relation between an amount of intake air in the internal combustion engine and a particulate matter trapping efficiency in the PM sensor according to the first embodiment.
FIG. 4(b) is a view showing the relation between an average amount of intake air after the completion of the execution of PM removal processing and a normality determination threshold value according to the first embodiment.
Figure 4:
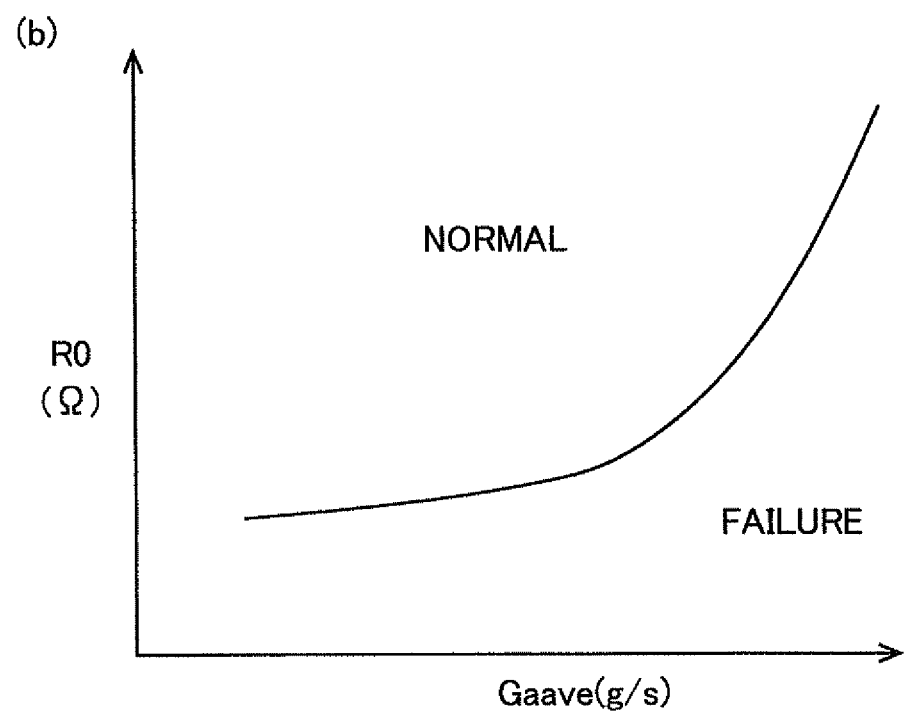

FIG. 2 is a view showing the schematic construction of the PM sensor 14. As shown in FIG. 2, the PM sensor 14 is provided with a pair of electrodes 14a, 14b. The PM sensor 14 outputs a resistance value between these electrodes 14a, 14b. FIG. 3 is a view showing the relation between an amount of PM deposition in the PM sensor 14 and the output value of the PM sensor 14. In FIG. 3, the axis of abscissa represents the amount of PM deposition in the PM sensor 14, and the axis of ordinate represents the output value of the PM sensor 14.

The particulate matter in the exhaust gas adheres to the PM sensor 14, so that the particulate matter deposits on and between the electrodes 14a, 14b. The particulate matter is a conductive substance, so the electric resistance between the electrodes 14a, 14b drops as the amount of PM deposition increases. Accordingly, as the amount of PM deposition in the PM sensor 14 increases, the output value of the PM sensor 14 decreases, as shown in FIG. 3.

As stated above, the PM sensor 14 is provided with the electric heater 16. As shown in FIG. 3, when the particulate matter excessively deposits on the PM sensor 14, the change in the output value of the PM sensor 14 with respect to change of the amount of PM deposition becomes small. For that reason, it becomes difficult to detect the amount of particulate matter in the exhaust gas in an accurate manner, based on the output value of the PM sensor 14.

Accordingly, PM removal processing to remove the particulate matter deposited on the PM sensor 14 is carried out by the ECU 10 at the timing at which the amount of PM deposition in the PM sensor 14 reaches a certain amount. The PM removal processing is achieved by heating the PM sensor 14 by means of the electric heater 16. With the PM sensor 14 being heated, the particulate matter deposited on the PM sensor 14 is oxidized and removed. When the execution of the PM removal processing is completed, particulate matter will begin to deposit on the PM sensor 14 again. Here, note that in this embodiment, the ECU 10, which carries out such PM removal processing, corresponds to a PM removal processing execution part according to the present invention.

[Failure Detection Method for the Filter]

Here, a failure detection method for a filter according to this embodiment will be explained. When a failure such as erosion, breakage or the like occurs in the filter 6, the amount of particulate matter flowing out of the filter 6 will increase. For that reason, the amount of PM deposition in the PM sensor 14 increases in comparison with that in normal time. As a result, the electric resistance between the electrodes 14a, 14b of the PM sensor 14 becomes smaller in comparison with that in normal time. That is, the output value of the PM sensor 14 becomes smaller in comparison with that in normal time.

Accordingly, in this embodiment, the presence or absence of a failure of the filter 6 is determined based on the output value of the PM sensor 14 at the time when an accumulated or integrated value of the amount of intake air in the internal combustion engine 1 (hereinafter referred to as an integrated amount of intake air) has reached a predetermined determination execution value after the execution of PM removal processing is completed (i.e., after particulate matter begins to deposit on the PM sensor 14 again). In other words, in cases where the output value of the PM sensor 14 at this time is smaller than a predetermined normality determination threshold value, a determination is made that a failure occurs in the filter 6.

Here, as the amount of intake air in the internal combustion engine 1 increases, the flow rate of the exhaust gas in the exhaust passage 3 increases. Then, the increase in the flow rate of the exhaust gas will also inevitably increase the flow rate of particulate matter. Accordingly, if the flow rate of the exhaust gas increases, the flow rate of particulate matter in the periphery of the PM sensor 14 will also increase, even if the state of the filter 6 is the same state. Assuming that the flow rate of particulate matter becomes large, the amount of particulate matter adhering to the PM sensor 14 itself will naturally increase in comparison with the case where the flow rate of particulate matter is small. However, the amount of particulate matter capable of adhering to the PM sensor 14 per unit time is limited. For that reason, when the flow rate of particulate matter increases, a particulate matter (PM) trapping rate or efficiency in the PM sensor 14 will tend to fall.

Accordingly, even if the state of the filter 6 is the same state, an amount of increase of the amount of PM deposition in the PM sensor 14 changes in accordance with the amount of intake air in the internal combustion engine 1. For that reason, if the above-mentioned normality determination threshold value is set without taking into consideration the amount of intake air in the internal combustion engine 1, it may become difficult to detect a failure of the filter 6 with a high degree of accuracy.

Accordingly, in this embodiment, the normality determination threshold value used for the failure detection of the filter 6 is set based on the amount of intake air in the internal combustion engine 1. More specifically, the normality determination threshold value is set based on an average value of the amount of intake air (hereinafter referred to as an average amount of intake air) from the time when particulate matter begins to deposit on the PM sensor 14 again after the completion of the execution of the PM removal processing until the integrated amount of intake air reaches the predetermined determination execution value.

FIG. 4(a) is a view showing the relation between the amount of intake air in the internal combustion engine 1 and the PM trapping efficiency in the PM sensor 14 according to the first embodiment. In FIG. 4(a), the axis of abscissa represents the amount of intake air Ga of the internal combustion engine 1, and the axis of ordinate represents the PM trapping efficiency Spm in the PM sensor 14. As shown in FIG. 4(a), when the amount of intake air in the internal combustion engine 1 increases and the flow rate of particulate matter increases, the PM trapping efficiency Spm in the PM sensor 14 decreases.

In addition, FIG. 4(b) is a view showing the relation between the average amount of intake air after the completion of the execution of the PM removal processing and the normality determination threshold value according to the first embodiment. In FIG. 4(b), the axis of abscissa represents the average amount of intake air Gaave in the internal combustion engine 1, and the axis of ordinate represents the normality determination threshold R0. As stated above, in this embodiment, when the output value of the PM sensor 14 is equal to or more than the normality determination threshold value R0, it is determined that the filter 6 is normal, and when the output value of the PM sensor 14 is smaller than the normality determination threshold value R0, it is determined that a failure has occurred in the filter 6. As shown in FIG. 4(b), the larger the value of the average mass airflow Gaave, the smaller the normality determination threshold value R0 is set to be.

Thus, the detection accuracy of the failure of the filter 6 can be improved by setting the normality determination threshold value in consideration of the change of the PM trapping efficiency according to the change of the amount of intake air.

Failure Detection Flow

Figure 5:
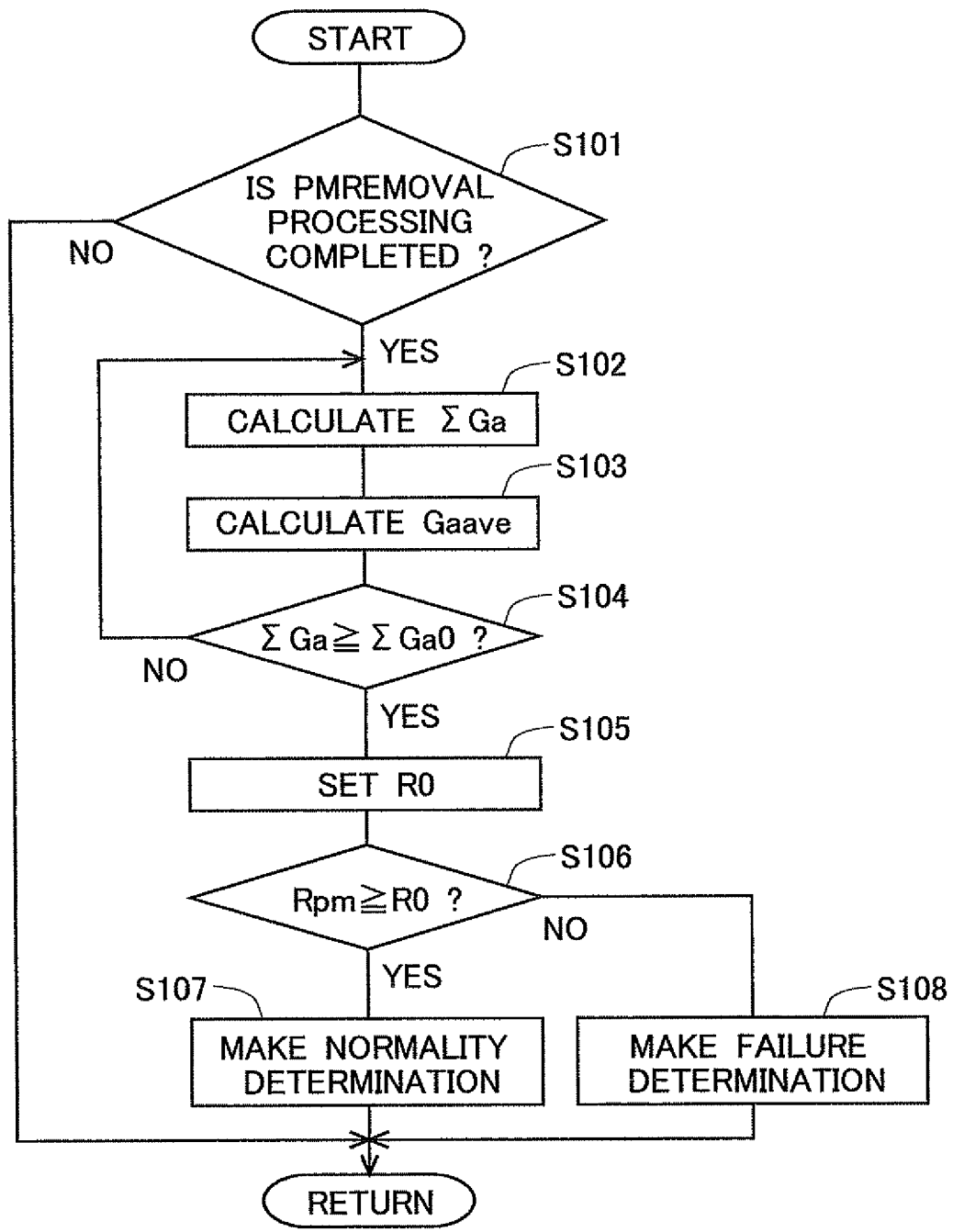
FIG. 5 This is a flow chart showing a flow for detecting a failure of a filter according to the first embodiment.

Hereinafter, reference will be made to a flow of filter failure detection according to this embodiment based on a flow chart shown in FIG. 5. This flow is beforehand stored in the ECU 10, and is repeatedly carried out at a predetermined interval during the operation of the internal combustion engine 1.

In this flow, first in step S101, it is determined whether PM removal processing to remove the particulate matter deposited on the PM sensor 14 has been completed. In 5101, when a determination is made that PM removal processing has been completed, then in step S102, an integrated value of the amount of intake air (an integrated amount of intake air) $\Sigma Ga$ in the internal combustion engine 1 from a time point of the completion of the PM removal processing is calculated. Further, in step S103, an average value of the amount of intake air (an average amount of intake air) Gaave in the internal combustion engine 1 from the time point of the completion of the PM removal processing is calculated.

Then, in step S104, it is determined whether the integrated amount of intake air $\Sigma Ga$ has reached a determination execution value $\Sigma Ga0$. Here, the determination execution value $\Sigma Ga0$ is a threshold value by which it can be decided that a certain amount of particulate matter, with which the failure of the filter 6 can be determined, has deposited in the PM sensor 14. In this embodiment, this determination execution value $\Sigma Ga0$ is a constant value which has been defined beforehand based on experiments, etc. This determination execution value $\Sigma Ga0$ is stored in the ECU 10.

In cases where a negative determination is made in step S104, the processing of step S102 is carried out again. On the other hand, in cases where an affirmative determination is made in step S104, the processing of step S105 is then carried out.

In step S105, the normality determination threshold value R0 is set based on the average amount of intake air Gaave. In this embodiment, the relation between the average amount of intake air Gaave and the normality determination threshold value R0 is stored in the ECU 10 as a map, as shown in FIG. 4(b). In step S105, the normality determination threshold value R0 is derived by assigning the average amount of intake air Gaave calculated in step S103 to this map.

Subsequently, in step S106, it is determined whether the output value Rpm of the PM sensor 14 is equal to or more than the normality determination threshold value R0. In cases where an affirmative determination is made in step S106, it is then determined in step S107 that the filter 6 is normal. On the other hand, in cases where a negative determination is made in step S106, it is determined in step S108 that a failure has occurred in the filter 6.

Here, note that in this embodiment, the ECU 10, which carries out the step S102 in the above-mentioned flow, corresponds to an integrated intake air amount calculation part according to the present invention. In addition, the step S102 corresponds to an integrated intake air amount calculation step according to the present invention. The ECU 10, which carries out the step S103 in the above-mentioned flow, corresponds to an average intake air amount calculation part according to the present invention. Also, the step S102 corresponds to an average intake air amount calculation step according to the present invention. The ECU 10, which carries out the step S105 in the above-mentioned flow, corresponds to a threshold setting part according to the present invention. Moreover, the step S105 corresponds to a threshold setting step according to the present invention. The ECU 10, which carries out the steps S106 through S108 in the above-mentioned flow, corresponds to a failure determination part according to the present invention. In addition, these steps S106 through S108 correspond to a failure determination step according to the present invention.

[Modification]

Figure 6:
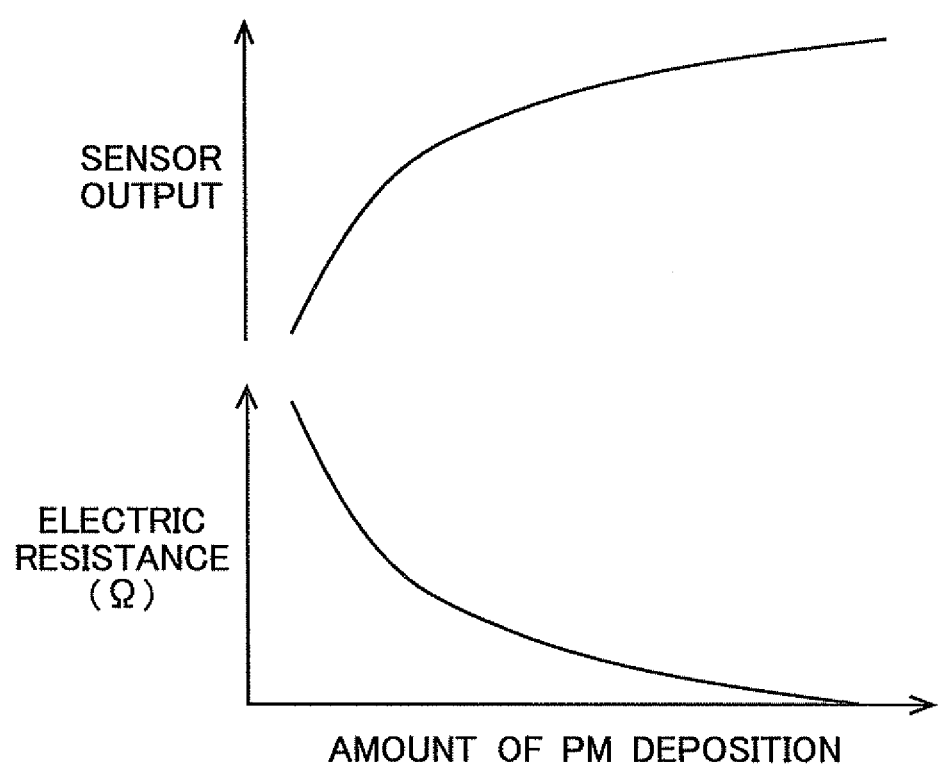
FIG. 6 This is a view showing the relation among an estimated amount of particulate matter in the PM sensor, a value of a resistance between electrodes, and an output value of the PM sensor according to a modified form of the first embodiment.

Here, note that the output value of the PM sensor 14 according to this embodiment may not necessarily be the resistance value between the electrodes 14a, 14b, but may be a voltage or a current between the electrodes 14a, 14b, or the like. In addition, as shown in FIG. 6, the PM sensor 14 may calculate the amount of PM deposition in this PM sensor 14 based on the resistance between the electrodes 14a, 14b, etc., and may output this amount of PM deposition. FIG. 6 is a view showing the relation between the amount of PM deposition in the PM sensor 14, the resistance value between the electrodes 14a, 14b, and the output value of the PM sensor 14. In FIG. 3, the axis of abscissa represents the amount of PM deposition in the PM sensor 14, the lower axis of ordinate represents the resistance value between the electrodes 14a, 14b, and the upper axis of ordinate represents the output value of the PM sensor 14.

In this case, the normality determination threshold value is set as an amount of PM deposition. Then, in cases where the output value of the PM sensor 14 at the time when the integrated amount of intake air has reached the determination execution value is larger than the normality determination threshold value, a determination is made that a failure occurs in the filter 6.

Second Embodiment

Figure 7:
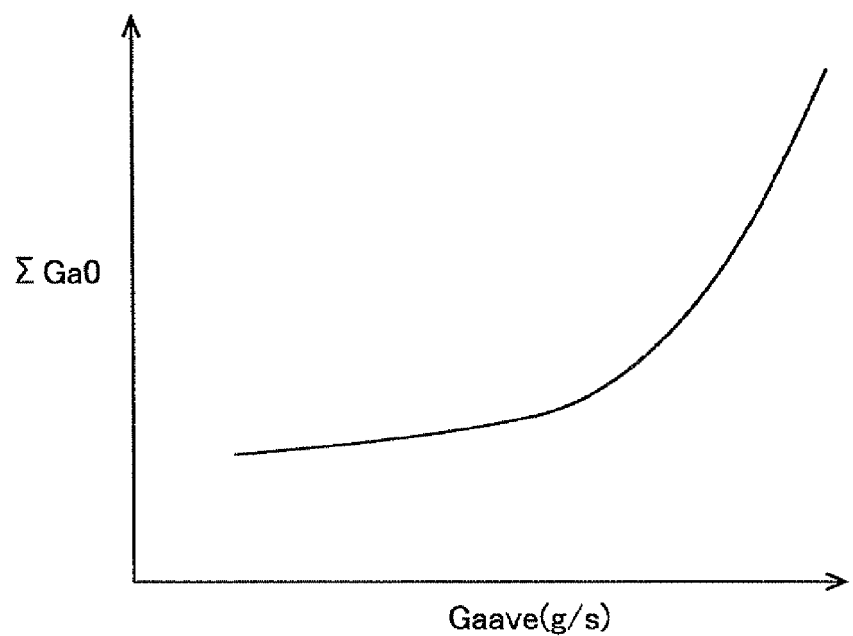
FIG. 7 This is a view showing the relation between an average amount of intake air after the completion of the execution of PM removal processing and a determination execution value according to a second embodiment of the present invention.

Reference will be made to a second embodiment of the present invention based on FIGS. 7 through 9. Here, only those which are different from the first embodiment will be explained.

[Failure Detection Method for the Filter]

The smaller the amount of intake air in the internal combustion engine 1, the smaller the flow rate of the exhaust gas becomes, and the smaller the flow rate of particulate matter also becomes. When the flow rate of particulate matter is small, the increasing speed of the amount of PM deposition in the PM sensor 14 is small. For that reason, assuming that the determination execution value, which is a threshold value for the execution of failure determination of the filter 6, is a constant value, as in the first embodiment, it will take time after the execution of PM removal processing has been completed until a failure determination of the filter 6 is carried out.

On the other hand, as stated above, the more the flow rate of particulate matter, the lower the PM trapping efficiency in the PM sensor 14 becomes. In other words, the smaller the flow rate of particulate matter, the higher the PM trapping efficiency in the PM sensor 14 becomes. When the PM trapping efficiency is high, even if a period of time after the execution of PM removal processing has been completed until the failure determination of the filter 6 is carried out is short, a difference in the amount of PM deposition in the PM sensor 14 between a normal time of the filter 6 and a failure time thereof will become large. Accordingly, even if this period of time is short, the accuracy of detecting a failure of the filter 6 is difficult to drop.

Accordingly in this embodiment, the determination execution value is changed according to the average amount of intake air after the completion of the execution of the PM removal processing. FIG. 7 is a view showing the relation between the average amount of intake air after the completion of the execution of the PM removal processing and the determination execution value according to this embodiment. In FIG. 7, the axis of abscissa represents the average amount of intake air Gaave, and the axis of ordinate represents the determination execution value $\Sigma Ga0$. As shown in FIG. 7, the larger the value of the average mass airflow Gaave, the smaller the determination execution value $\Sigma Ga0$ is set to be.

In this manner, by setting the determination execution value in consideration of the change of the PM trapping efficiency according to the change of the amount of intake air, it is possible to detect the failure of the filter 6 in a as early as possible stage, while maintaining the detection accuracy.

Here, note that in this embodiment, the normality determination threshold value is set to be a larger value in comparison with the case where the determination execution value is made to be the constant value as in the first embodiment, following the changing of the determination execution value, as mentioned above. FIG. 8 is a view showing the relation between the average amount of intake air after the completion of the execution of the PM removal processing and the normality determination threshold value according to this embodiment. In FIG. 8, the axis of abscissa represents the average amount of intake air Gaave, and the axis of ordinate represents the normality determination threshold value R0. In addition, in FIG. 8, a solid line L1 represents the determination execution value according to this second embodiment, and a broken line L2 represents the determination execution value according to the first embodiment.

[Failure Detection Flow]

Hereinafter, reference will be made to a flow of filter failure detection according to this embodiment based on a flow chart shown in FIG. 9. This flow is beforehand stored in the ECU 10, and is repeatedly carried out at a predetermined interval during the operation of the internal combustion engine 1. Here, note that this flow is different from the flow shown in FIG. 5 only in that a step S204 is newly added. Here, only those differences of this flow from the flow shown in FIG. 5 will be explained.

In this flow, the processing of step S204 is carried out after the processing of step S103. In step S204, the determination execution value ΣGa0 is set based on the average amount of intake air Gaave. In this embodiment, the relation between the average amount of intake air Gaave and the determination execution value ΣGa0 is stored in the ECU 10 as a map, as shown in FIG. 7. In step S204, the determination execution value ΣGa0 is derived by assigning the average amount of intake air Gaave calculated in step S103 to this map.

Then, in step S104, it is determined whether the integrated amount of intake air EGa has reached the determination execution value ΣGa0 set in step S204.

Figure 8:
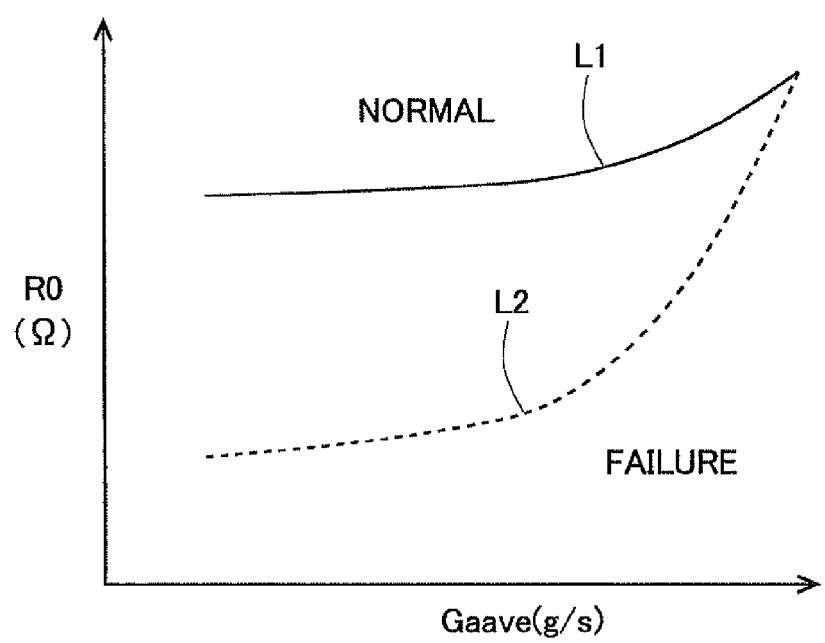
FIG. 8 This is a view showing the relation between an average amount of intake air after the completion of the execution of PM removal processing and a normality determination threshold value according to the second embodiment.
Figure 9:
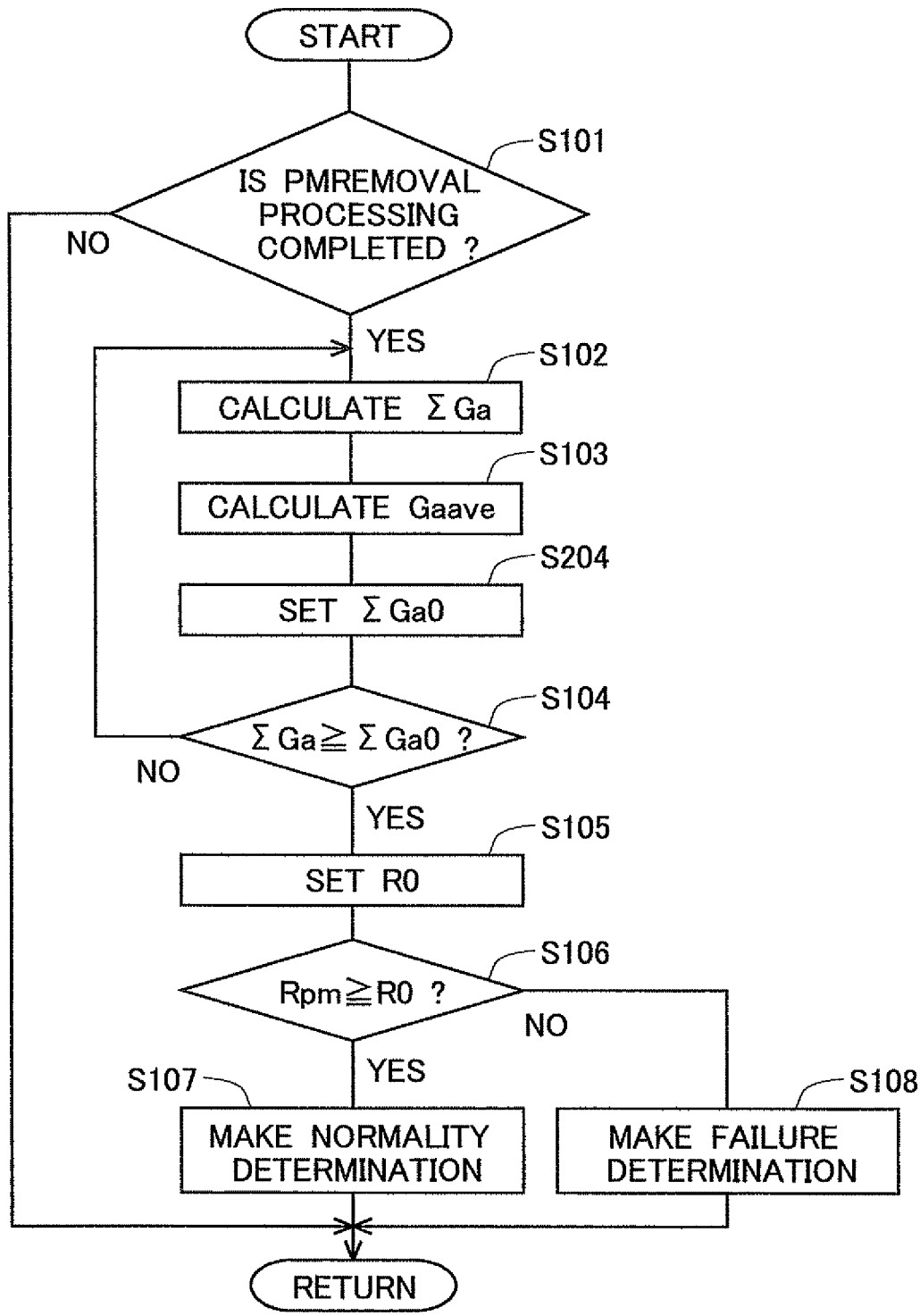
FIG. 9 This is a flow chart showing a flow for detecting a failure of a filter according to the second embodiment.

In addition, in this embodiment, the relation between the average amount of intake air Gaave and the normality determination threshold value R0, as shown in FIG. 8, is stored in the ECU 10 as a map. In step S105, the normality determination threshold value R0 is derived by assigning the average amount of intake air Gaave calculated in step S103 to this map.

Here, note that in this embodiment, the ECU 10, which carries out the step S204 in the above-mentioned flow, corresponds to a determination execution value setting part according to the present invention. Moreover, the step S204 corresponds to a determination execution value setting step according to the present invention.

Third Embodiment

Reference will be made to a second embodiment of the present invention based on FIGS. 10 through 12. Here, only those which are different from the first embodiment will be explained.

[Failure Detection Method for the Filter]

The air fuel ratio of the air-fuel mixture in the internal combustion engine 1 or the temperature of the internal combustion engine 1 changes according to an operating state or operational condition of the internal combustion engine 1. Then, if the air fuel ratio of the air-fuel mixture in the internal combustion engine 1 or the temperature of the internal combustion engine 1 varies, the amount of particulate matter discharged from the internal combustion engine 1, i.e., the flow rate of particulate matter, will change, even when the amount of intake air in the internal combustion engine 1 is the same or unchanged. For example, when the air fuel ratio of the air-fuel mixture in the internal combustion engine 1 becomes equal to or less than a stoichiometric air fuel ratio, the flow rate of particulate matter increases in accordance with the lowering air fuel ratio. In addition, when the temperature (cooling water temperature) of the internal combustion engine 1 becomes equal to or less than a certain temperature, the flow rate of particulate matter increases in accordance with the lowering engine temperature.

Accordingly, in this embodiment, a failure determination of the filter 6 is made by taking into consideration the air fuel ratio of the air-fuel mixture in the internal combustion engine 1 and the cooling water temperature. Specifically, the amount of intake air in the internal combustion engine 1 at the time of calculating the integrated amount of intake air after the completion of the execution of the PM removal processing is corrected based on the air fuel ratio of the air-fuel mixture in the internal combustion engine 1 and the cooling water temperature.

In this embodiment, the integrated amount of intake air is calculated by the following equation (1).

$$\Sigma Ga(n) = \Sigma Ga(n-1) + (Ga \times kaf \times kthw) \quad (1)$$

ΣGa(n): a current integrated amount of intake air

ΣGa(n−1): an integrated amount of intake air until the last time

Figure 10:
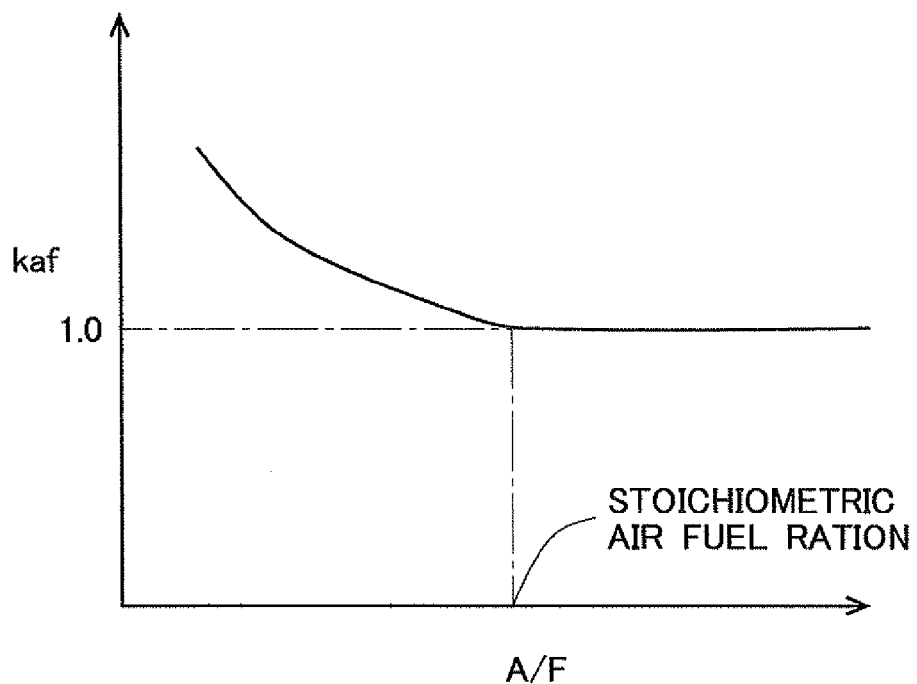
FIG. 10 This is a view showing the relation between an air fuel ratio of a mixture in an internal combustion engine and a correction coefficient thereof according to a third embodiment of the present invention.

Ga: an amount of intake air at the current time point kaf: a correction coefficient based on the air fuel ratio of the air-fuel mixture kthw: a correction coefficient based on the cooling water temperature FIG. 10 is a view showing the relation between the air fuel ratio of the air-fuel mixture in the internal combustion engine 1 and the correction coefficient kaf. In FIG. 10, the axis of abscissa represents the air fuel ratio A/F of the air-fuel mixture in the internal combustion engine 1, and the axis of ordinate represents the correction coefficient kaf. As shown in FIG. 10, the correction coefficient kaf is a value of 1 or more, and in cases where the air fuel ratio A/F of the air-fuel mixture is equal to or less than the stoichiometric air fuel ratio, it takes a value that increases in accordance with the decreasing air fuel ratio A/F of the air-fuel mixture.

Figure 11:
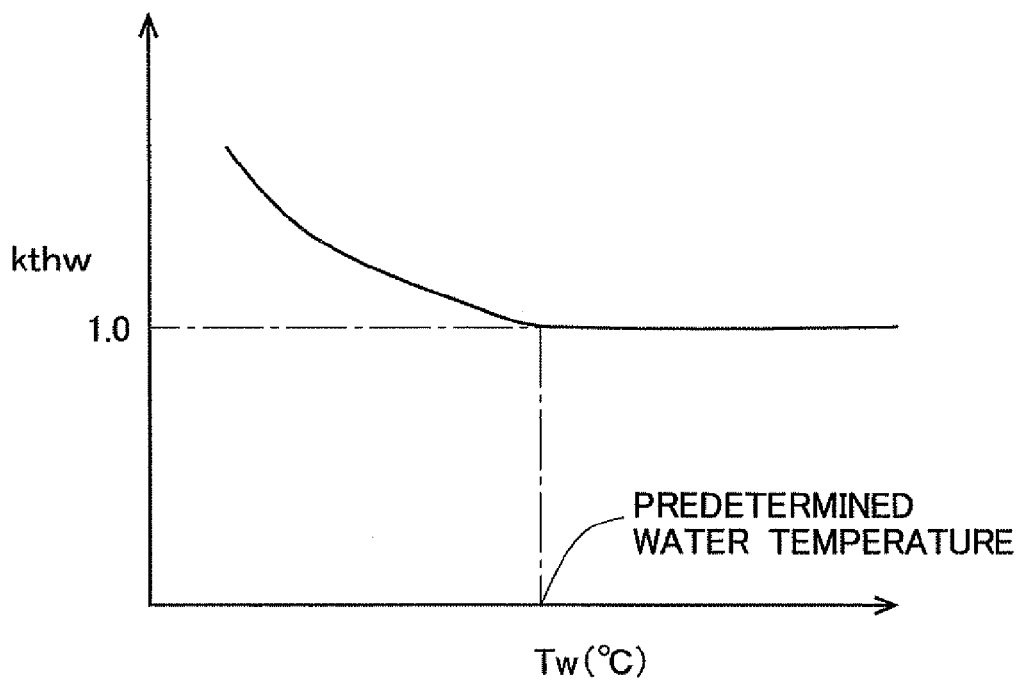
FIG. 11 This is a view showing the relation between a temperature of cooling water and a correction coefficient thereof according to the third embodiment.
Figure 12:
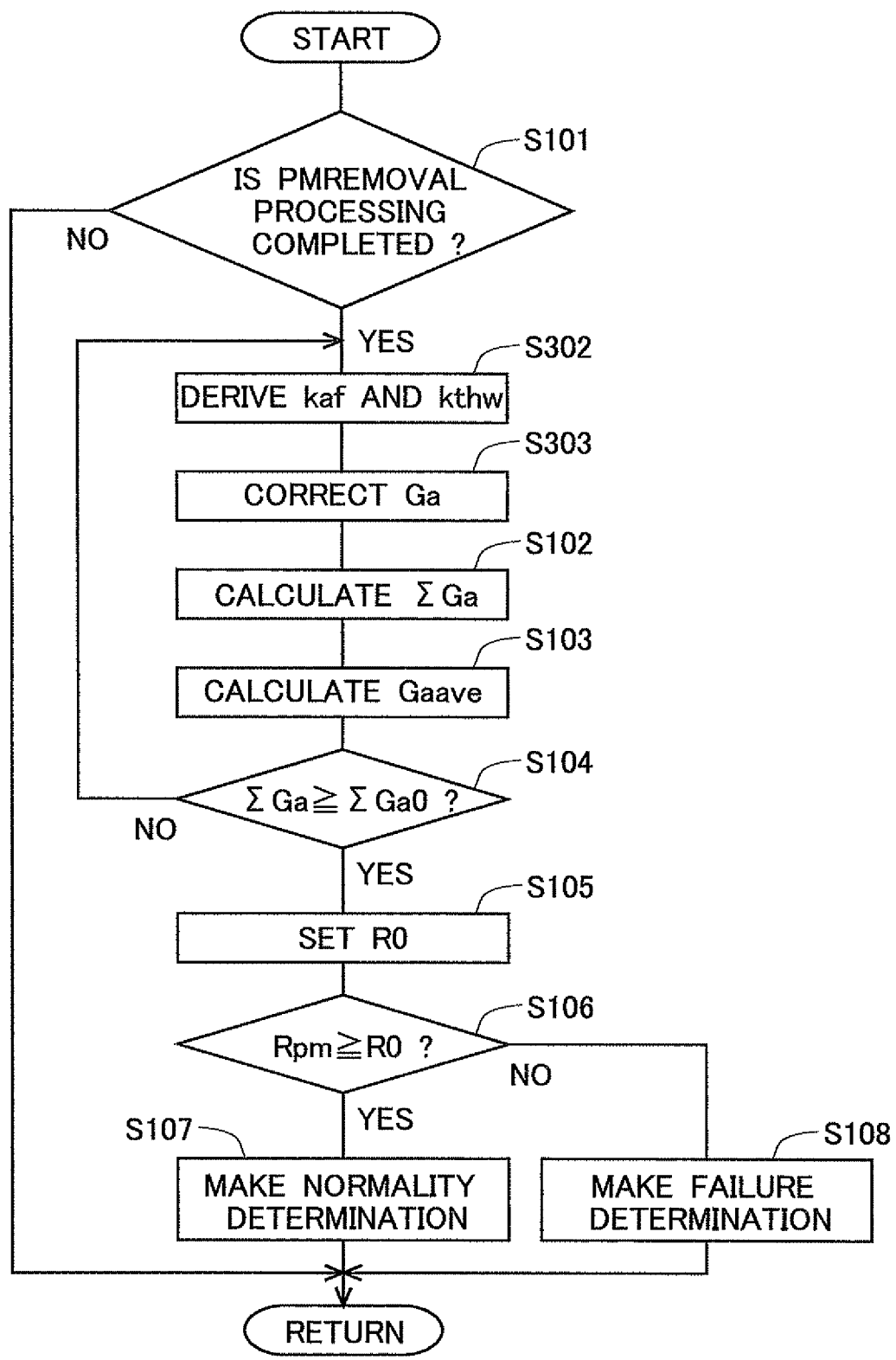
FIG. 12 This is a flow chart showing a flow for detecting a failure of a filter according to the third embodiment.

FIG. 11 is a view showing the relation between the cooling water temperature and the correction coefficient kthw. In FIG. 11, the axis of abscissa represents the cooling water temperature Tw, and the axis of ordinate represents the correction coefficient kthw. As shown in FIG. 11, the correction coefficient kthw is a value of 1 or more, and in cases where the cooling water temperature Tw is equal to or less than a predetermined water temperature (e.g., 60-80 degrees C.), it takes a value that becomes larger in accordance with the lowering cooling water temperature Tw.

In this manner, in this embodiment, in cases where the air fuel ratio of the air-fuel mixture is equal to or less than the stoichiometric air fuel ratio, the lower this air fuel ratio, the more the amount of intake air is corrected to be than an actual amount thereof. In addition, in cases where the cooling water temperature is equal to or less than the predetermined water temperature, the lower this water temperature, the more the amount of intake air is corrected to be than its actual amount. According to these, in cases where the air fuel ratio of the air-fuel mixture is equal to or less than the stoichiometric air fuel ratio, or in cases where the cooling water temperature is equal to or less than the predetermined water temperature, even if the actual amount of intake air is the same or unchanged, the integrated amount of intake air and the average amount of intake air used as parameters for failure determination of the filter 6 will be calculated as values which become larger in accordance with the increasing flow rate of particulate matter. For that reason, it becomes possible to perform a failure determination of the filter 6 in accordance with the actual flow rate of particulate matter.

Thus, according to the failure determination method for a filter according to this embodiment, it is possible to maintain the accuracy of detecting a failure of the filter 6 at a high level, without regard to the operating state or operational condition of the internal combustion engine 1.

[Failure Detection Flow]

Hereinafter, reference will be made to a flow of filter failure detection according to this embodiment based on a flow chart shown in FIG. 12. This flow is beforehand stored in the ECU 10, and is repeatedly carried out at a predetermined interval during the operation of the internal combustion engine 1. Here, note that this flow is different from the flow shown in FIG. 5 only in that steps S302, S303 are newly added. Here, only differences of the flow shown in FIG. 12 therefrom will be explained.

In this flow, when it is determined in step S101 that the execution of PM removal processing has been completed, the processing of step S302 is then carried out. In step S302, the correction coefficients kaf and kthw for correcting the amount of intake air Ga are derived based on the air fuel ratio A/F of the air-fuel mixture in the internal combustion engine 1 and the cooling water temperature Tw. Here, note that the air fuel ratio of the air-fuel mixture can be calculated based on the amount of fuel injection and the amount of intake air Ga in the internal combustion engine 1.

In this embodiment, the relation between the air fuel ratio A/F of the air-fuel mixture in the internal combustion engine 1 and the correction coefficient kaf, as shown in FIG. 10, is stored in the ECU 10 as a map. In step S302, the correction coefficient kaf is derived by assigning the air fuel ratio A/F of the air-fuel mixture in the internal combustion engine 1 to this map. In addition, in this embodiment, the relation between the cooling water temperature TW and the correction coefficient kthw, as shown in FIG. 11, is stored in the ECU 10 as a map. In step S302, the correction coefficient kthw is derived by assigning the cooling water temperature Tw to this map.

Subsequently, in step S303, the amount of intake air Ga at the current time is corrected by the correction coefficients kaf and kthw.

Then, in step S102, the integrated amount of intake air ΣGa is calculated by integrating the amount of intake air Ga corrected in step S303. In other words, in step S102 according to this flow, the integrated amount of intake air ΣGa is calculated by the above-mentioned equation (1).

Here, note that the above-mentioned respective embodiments can be combined with another wherever possible.

DESCRIPTION OF THE REFERENCE SIGNS

1 . . . internal combustion engine
3 . . . exhaust passage
6 . . . particulate filter
7 . . . oxidation catalyst
10 . . . ECU
11 . . . crank position sensor
12 . . . accelerator opening sensor
14 . . . PM sensor
15 . . . water temperature sensor

The invention claimed is:

1. A failure detection apparatus for a particulate filter in which a failure of the particulate filter arranged in an exhaust passage of an internal combustion engine is detected, said failure detection apparatus comprising:
a PM sensor that is arranged in the exhaust passage at the downstream side of said particulate filter, and outputs a signal corresponding to an amount of particulate matter deposited on itself;
a PM removal processing execution part that executes PM removal processing to remove the particulate matter deposited on said PM sensor;
a failure determination part that determines the presence or absence of a failure in said particulate filter by making a comparison between an output value of said PM sensor at the time when a predetermined period of time has elapsed after the execution of the PM removal processing by said PM removal processing execution part is completed, and a predetermined threshold value;
an average intake air amount calculation part that calculates an average value of an amount of intake air in the internal combustion engine during a time after the execution of the PM removal processing by said PM removal processing execution part is completed until said predetermined period of time elapses; and
a threshold setting part that sets said threshold value based on the average value of the amount of intake air calculated by said average intake air amount calculation part.

2. The failure detection apparatus for a particulate filter as set forth in claim 1, further comprising:
an integrated intake air amount calculation part that calculates an integrated value of the amount of intake air in the internal combustion engine from the time when the execution of the PM removal processing by said PM removal processing execution part is completed;
wherein said predetermined period of time is a period of time until the integrated value of the amount of intake air calculated by said integrated intake air amount calculation part reaches a predetermined determination execution value; and
wherein said failure detection apparatus further comprises a determination execution value setting part that sets said determination execution value to be smaller when the average value of the amount of intake air calculated by said average intake air amount calculation part is small, in comparison with the time when the average value of the amount of intake air is large.

3. A failure detection method for a particulate filter in which a failure of the particulate filter arranged in an exhaust passage of an internal combustion engine is detected based on an output value of a PM sensor which is arranged in the exhaust passage at the downstream side of said particulate filter, and outputs a signal corresponding to an amount of particulate matter deposited on itself, said failure detection method comprising:
a PM removal processing execution step to execute PM removal processing to remove the particulate matter deposited on said PM sensor;
a failure determination step to determine the presence or absence of a failure in said particulate filter by making a comparison between the output value of said PM sensor at the time when a predetermined period of time has elapsed after, the execution of the PM removal processing in said PM removal processing execution step is completed, and a predetermined threshold value;
an average intake air amount calculation step to calculate an average value of an amount of intake air in the internal combustion engine during a time after the execution of the PM removal processing in said PM removal processing execution step is completed until said predetermined period of time elapses; and
a threshold setting step to set said threshold value based on the average value of the amount of intake air calculated in said average intake air amount calculation step.

4. The failure detection method for a particulate filter as set forth in claim 3, further comprising:
an integrated intake air amount calculation step to calculate an integrated value of the amount of intake air in the internal combustion engine from the time when the execution of the PM removal processing in said PM removal processing execution step is completed;
wherein said predetermined period of time is a period of time until the integrated value of the amount of intake air calculated in said integrated intake air amount calculation step reaches a predetermined determination execution value; and
wherein said failure detection method further comprises a determination execution value setting step to set said determination execution value to be smaller when the average value of the amount of intake air calculated in said average intake air amount calculation step is small, in comparison with the time when the average value of the amount of intake air is large.

* * * * *